United States Patent
Rix et al.

[11] 3,916,716
[45] Nov. 4, 1975

[54] FINE-TOOTHED GEAR PAIR CONSISTING OF SYNTHETIC MATERIAL

[75] Inventors: Albert Rix; Hans Fuchs; Rolf Moritz, all of Wilhelmshaven; Erhard Ubben, Aurich-Popens, all of Germany

[73] Assignee: Olympia Werke AG, Wilhelmshaven, Germany

[22] Filed: Jan. 16, 1975

[21] Appl. No.: 541,561

[52] U.S. Cl. .................................. 74/461; 74/462
[51] Int. Cl.² ................... F16H 55/14; F16H 55/06
[58] Field of Search .................... 74/461, 462, 411

[56] References Cited
UNITED STATES PATENTS

| | | | |
|---|---|---|---|
| 2,017,139 | 10/1935 | Wood | 74/461 UX |
| 3,169,408 | 2/1965 | Rouverol | 74/461 |
| 3,304,795 | 2/1967 | Rouverol | 74/461 X |

Primary Examiner—Leonard H. Gerin
Attorney, Agent, or Firm—Spencer & Kaye

[57] ABSTRACT

A fine-toothed gear pair is formed of a driving member and a driven member; the teeth of one gear member are made of a fully elastic material and the teeth of the other gear member are made of a material which is less elastic than the other. The shape of the teeth is such that, when the meshing parts of the two gear members are passing the geometrical connection line between the center points of curvature of the two gear members, a. a full surface touching occurs between the head flank of the teeth of the less elastic gear member and the foot flank of the teeth of the fully elastic gear member;

b. the direction of load of the meshing teeth of the tooth gear pair is normal to the foot flank of the teeth of the fully elastic gear member; and c. the head flank of the teeth of the less elastic gear member is inclined approximately by 5° steeper with regard to the foot flank of the teeth of the fully elastic gear member, whereby only a small deformation occurs in the direction of the deepest point of the foot flank of the teeth of the fully elastic gear member.

4 Claims, 5 Drawing Figures

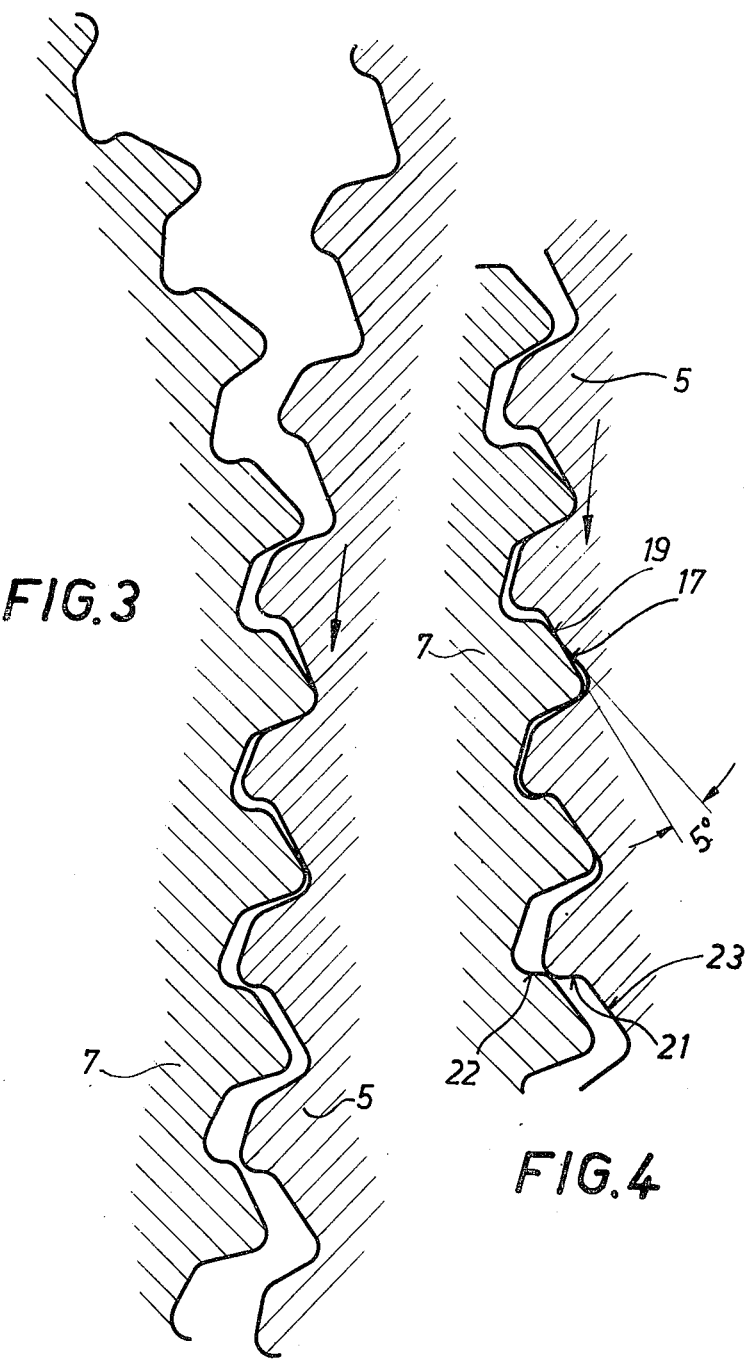

FINE-TOOTHED GEAR PAIR CONSISTING OF SYNTHETIC MATERIAL

BACKGROUND OF THE INVENTION

The invention relates to a fine-toothed gear pair with a driving and a driven gear member. The elasticity of the material of the teeth of the driving member is greater than the elasticity of the material of the teeth of the driven member.

Synthetic materials of different types have long been used for the manufacture of toothed gears. Thus, for example, polyamides or elastic polyurethanes, or woven fabrics impregnated with phenyl resin, have been used for making toothed gears because, due to their elastic properties, operational noises are substantially suppressed and further, a protection of the entire structure is ensured.

Unfortunately, gears of this type have the disadvantage that they are only able to transmit low forces, whereby their application range is very limited.

Tests relating to the load resistance of thermoplastic toothed gears are set forth, for example, in the periodical KONSTRUKTION, 20th Year (1968), Issue 10, pages 385–390, Springer Verlag Berlin, Dr. G. Klein "Untersuchungen zur Tragfähigkeit thermoplastischer Kunststoffzahnräder". These tests showed that deformations are of particular significance in toothed gears made of synthetic material. They increase the degree of overlap, so that the load on the individual tooth is effectively decreased. Nevertheless, in case high torques are transmitted with fine-toothed gear pairs made of synthetic material and having a conventional tooth structure such as involute teeth or Novikov teeth, tooth breakages have occurred.

SUMMARY OF THE INVENTION

It is an object of the invention to provide an improved fine-toothed gear pair consisting of synthetic material, having an elastic gearing profile which can be loaded heavily and which has a long life. Hereby bending stresses at the teeth should largely be eliminated. This object and other objects of the invention are accomplished by the invention in the following way:

In a fine-toothed gear pair formed of a driving member and a driven member, whereby the teeth of one gear member consists of fully elastic material and the teeth of the other gear member consists of a material which is less elastic than the other, the shaping of the teeth being such that, when the two gear members are passing the geometrical connection line between the center points of curvature of the two gear members, the following conditions are fulfilled:

a. a full surface touching between the tooth head flank of the teeth of the less elastic gear member and the tooth foot flank of the teeth of the fully elastic gear member, b. the direction of load of the meshing teeth of the tooth gear pair is normal to the foot flank of the teeth of the fully elastic gear member, c. the head flank of the teeth of the less elastic gear member is inclined approximately by 5° steeper with regard to the foot flank of the teeth of the fully elastic gear member, thereby only a small deformation occurs in direction to the deepest point of the foot flank of the teeth of the fully elastic gear member.

Comparing an involute gearing having two convex flanks, and a circular arch gearing having a concave-convex helical gearing, with a gearing according to the invention, in the latter there does not exist the danger of toothbreaking in high load conditions. The fine gearing according to the invention leads to very small shearing and bending stresses because of the full surface contact. The main stress points are at the ground of the teeth. A large volume of material takes up the work of deformation at a place where no danger exists. Hereby it is possible to transmit large forces with small tooth heights.

According to an improvement of the invention the gearing cannot slide through when running in and out.

BRIEF DESCRIPTION OF THE DRAWINGS

FIG. 3 is a diagram showing the gearing of the driving shaft and the driven member without a force excerted.

FIG. 4 is a view similar to FIG. 3, but with a force excerted.

DESCRIPTION OF THE PREFERRED EMBODIMENT

Figure 1:
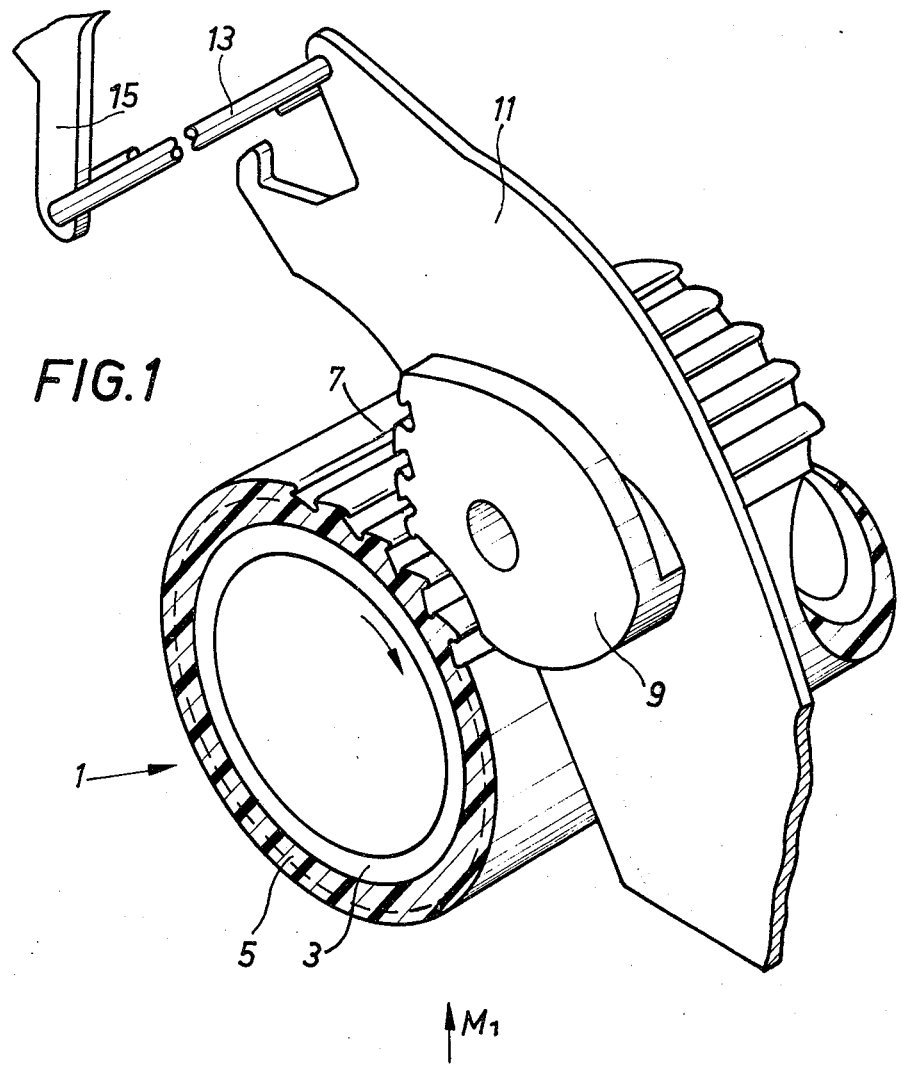
FIG. 1 is a perspective view of a gear pair which includes a drive shaft and a driven member such as a cam.

Turning now to FIG. 1, there is shown a drive mechanism for type bar drives in typewriters. The continuously and unidirectionally rotating carrier shaft 3 has a sprayed-on tooth structure 5 made of a fully elastic synthetic material to constitute a driving member, such as a drive shaft 1. The synthetic material may be, for example a polyamide belonging to the group of thermoplastic synthetic materials. The fine-toothed structure 5 of the drive shaft 1 cooperates with a fine-toothed structure 7 of a driven member, such as a cam 9. The tooth structure 7 is made of a less elastic material, such as an acetal resin. The cam 9 is rotatably held on an intermediate lever 11 and may be coupled for a brief period to the drive shaft 1 by control components, not shown. By virtue of a form-locking engagement, the cam 9, rotated by the shaft 1, pivots the intermediate lever 11 which exerts a force on a type bar 15 is a known manner by means of a taut wire 13.

Turning now to FIG. 3, there is shown the toothing of the two gears 5 and 7 of the driving shaft 1 and the cam member 9, both shown in a non-stressed condition. It can be seen that the tooth division of the gear member having the smaller elasticity (the driven cam 9) is smaller than that of the fully elastic tooth member (the driving shaft 1). In this manner, during higher stresses the second tooth, following the first tooth which is loaded and deformed, cannot hit a tooth of the drive shaft 1. Thereby during a gear coupling process, there cannot occur gear damages.

Turning now to FIG. 4, the gear pair according to FIG. 3 is shown during transmission of a force. Head flank 17 of a tooth of cam member 9 is inclined about 5° deeper with regard to the foot flank 19 of the teeth of gearing 5 of drive shaft 1. As a result, only a small deformation occurs in the direction of the deepest point of the foot flank 19. By this advantageous measure and early sliding of the other corresponding tooth at the foot flank 19 does not take place and thereby tooth bending stresses at the maximum loaded point are eliminated. Maximum load occurs during passing of the geometrical line connecting the center point curvature M 1 – M 2 of the two tooth member of FIG. 2.

Figure 2:
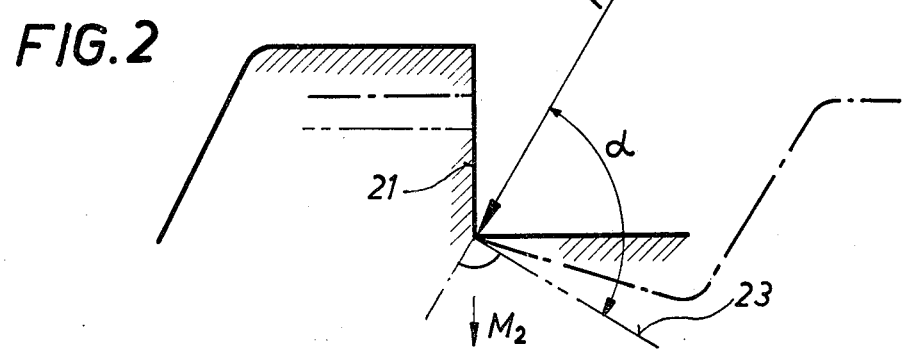
FIG. 2 is a diagram showing the direction of the force P to be transmitted.

Turning now back to FIG. 2, there is shown the direction of load of force P to be transmitted. With an angle $\alpha = 90°$ between force P and foot flank 23 (broken line), the head flank 21 does not take up any bending forces, because in this case only foot flank 23 is loaded. Thus, the deforming work takes place at an uncritical place having a high volume of material. Furthermore, high forces can be transmitted with small tooth heights.

The short radial foot flank 22 of gearing 7 of cam member 9 and the short radial head flank 21 of gearing 5 of drive shaft 1 mate each other during the passage of the connecting line between the center points of curvature M 1 – M 2. Hereby any sliding during running out of the teeth is eliminated.

Figure 5:
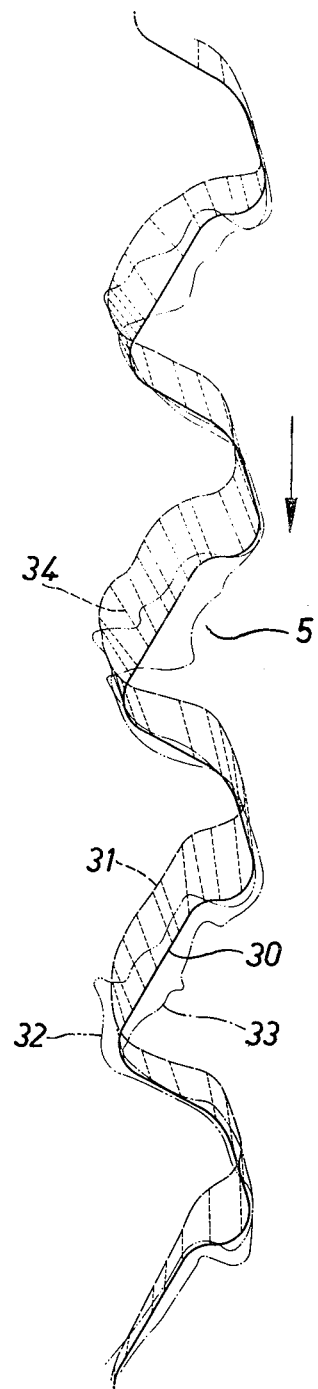
FIG. 5 is a diagram showing the distribution of stress over several teeth during the transmission of force.

The most preferred distribution of force of the tooth gear pair is shown in FIG. 5. The solid lines in FIG. 5 show the profile of gearing of drive shaft 1 without stress, whereas the broken lines 31 show the same parts under stress. Line 32 shows the shearing stresses and line 33 the pressure-tension-stresses. Furthermore, lines 34 show the direction of displacement of the loaded gear teeth. All lines 34 show that the maximum of load lies in the tooth ground and therefore cannot have any adverse effect on the life of the gears.

The toothed gear pair 5, 7 according to the invention, has the advantage of having a capacity of transmitting high forces and having a long life expectancy. Furthermore, the toothed gear pair 5, 7 can be used for intermittently driven gears as well as for permanently engaged gears.

We claim:

1. In a fine-toothed gear pair formed of a driving gear member and a driven gear member; the teeth of one gear member being made of a fully elastic material and the teeth of the other gear member being made of a material which is less elastic than the other, each tooth having a head flank and a foot flank; the improvement wherein the shape of the teeth being such that, when the meshing parts of the two gear members are passing the geometrical connection line between the center points of curvature of the two gear members,
    a. a full surface touching occurs between the head flank of the teeth of the less elastic gear member and the foot flank of the teeth of the fully elastic gear member;
    b. the direction of load of the meshing teeth of the tooth gear pair is normal to the foot flank of the teeth of the fully elastic gear member; and
    c. the head flank of the teeth of the less elastic gear member is inclined approximately by 5° steeper with regard to the foot flank of the teeth of the fully elastic gear member for effecting only a small deformation in the direction of the deepest point of the foot flank of the teeth of the fully elastic gear member.

2. In a fine-toothed gear pair as defined in claim 1, wherein the spacing between the teeth of the less elastic gear member is smaller than the spacing of the teeth of the fully elastic gear member.

3. In a fine-toothed gear pair as defined in claim 1, wherein the teeth of both gear members have short radial foot and head flanks; the radial head flanks of one gear member mating with the radial foot flanks of the other gear member when passing through the connecting line between the center points of curvature of the two gear members.

4. In a fine-toothed gear pair as defined in claim 1, wherein the spacing between the teeth of the less elastic gear member is smaller than the spacing of the teeth of the fully elastic gear member, and the teeth of both gear members have short radial foot and head flanks; the radial head flanks of one gear member mating with the radial foot flanks of the other gear member when passing through the connecting line between the center points of curvature of the two gear members.

* * * * *